United States Patent [19]
Harms

[11] Patent Number: 5,339,124
[45] Date of Patent: Aug. 16, 1994

[54] UNDERWATER PRESSURE PROTECTION SWITCH

[76] Inventor: Wolfgang Harms, 216 Haddon Ave., Ste. 522, Westmont, N.J. 08108

[21] Appl. No.: 157,384

[22] Filed: Nov. 23, 1993

[51] Int. Cl.⁵ .............................................. G03B 17/08
[52] U.S. Cl. ........................................ 354/64; 354/266
[58] Field of Search .......................... 354/64, 266, 288

[56] References Cited
U.S. PATENT DOCUMENTS 5,126,772  6/1992  Albrecht ............................. 354/64

*Primary Examiner*—Howard B. Blankenship
*Attorney, Agent, or Firm*—Norman E. Lehrer

[57] ABSTRACT

An underwater camera or instrument having a depressible shutter release button or similar actuator is housed within a flexible plastic waterproof housing. A toggle lever is mounted on the camera with one end overlying the button. Surrounding the lever is a frame member that extends upwardly to separate the housing from the lever so as to prevent water pressure acting on the housing from applying a force on the button.

18 Claims, 2 Drawing Sheets

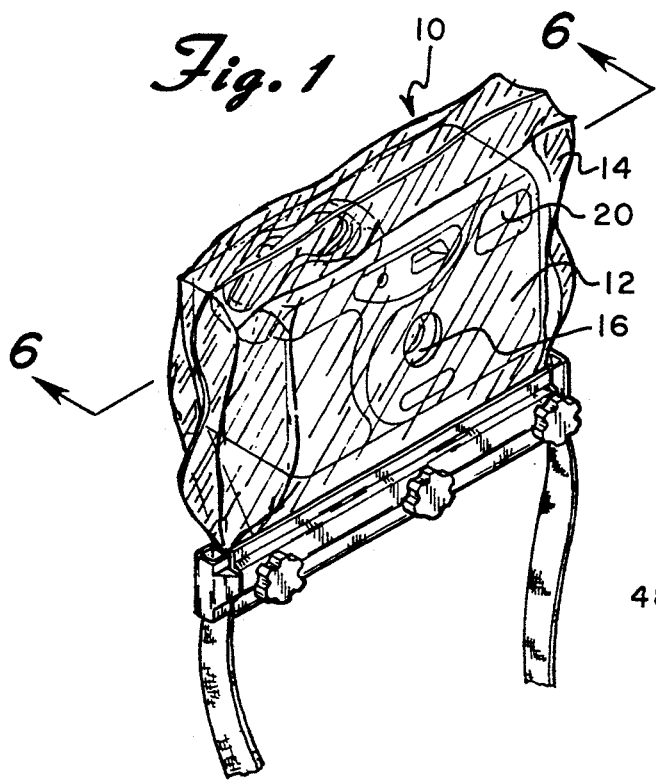
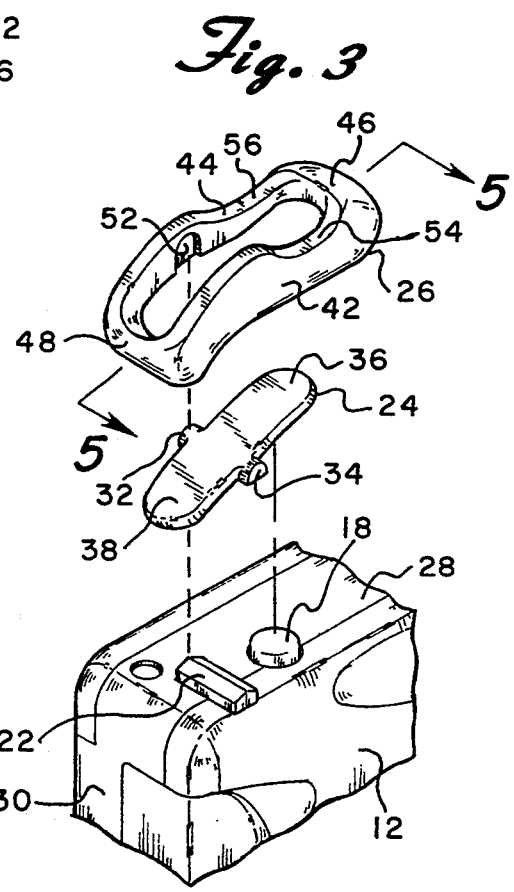
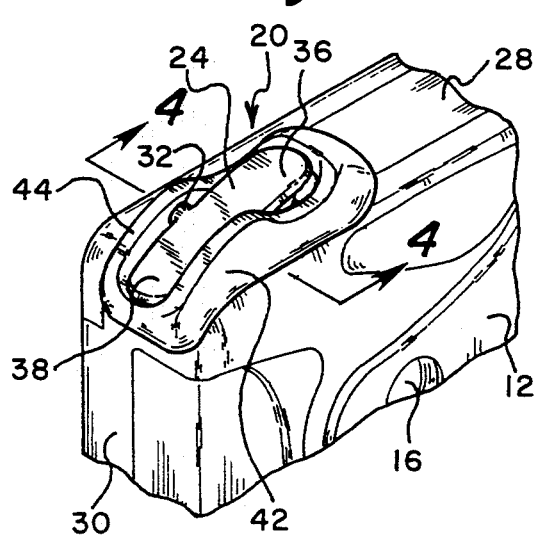
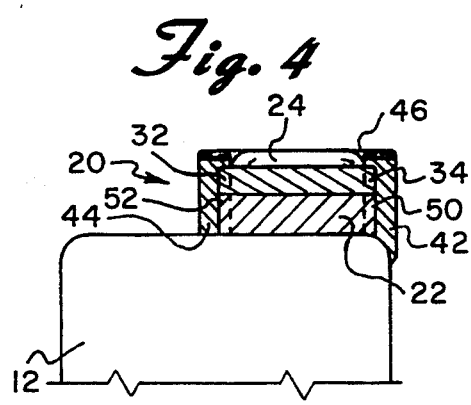

5,339,124

UNDERWATER PRESSURE PROTECTION SWITCH

BACKGROUND OF THE INVENTION

The present invention is directed toward underwater cameras and more particularly to a pressure protection switch for use with underwater cameras in a flexible housing.

Various arrangements have been proposed in the past for taking underwater photographs. These have ranged from complex designs for cameras which have been constructed to be waterproof or waterproof housings which are simply adapted to incase a more conventional camera. Some underwater housings have been constructed of relatively rigid materials in order to withstand the significant water pressures which can build up underwater. These rigid or hard housings, however, require relatively intricate fittings, lever switches and the like in order to depress the shutter button from outside of the housing.

A much simpler type of housing which has also been used is a flexible plastic housing which totally surrounds the camera. The flexible plastic is substantially clear, at least in the area of the lens, and is flexible enough so that the shutter release button can be operated from outside of the housing directly through the housing by simply depressing the same.

Such flexible plastic housings have proven to be successful. However, at significant depths, the water pressure acting on the flexible housing can be so great that it can over power the spring return force of the shutter button so that when the button is manually depressed, it does not return to its original position.

The patent to Albrecht, U.S. Pat. No. 5,126,772, proposes the use of a seesaw means mounted in the vicinity of the shutter button with one end of the seesaw directly overlying the button. The stated purpose of this arrangement is to prevent water pressure from inadvertently depressing the shutter button. The seesaw device apparently acts to balance the water pressure by allowing the same to act on both ends of the seesaw thereby allegedly reducing pressure on the button itself.

At depths of 40 feet or more, however, flexible housings are no longer flexible due to the high water pressures thereon. As a result, a balancing function would not work due to the very tight holding grip of the flexible plastic housing around the camera body. Furthermore, even if there is a balancing effect taking place, the use of the seesaw in the Albrecht device increases the area on the flexible housing that can be pressed in order to activate the shutter, thereby making it possible for the operator to easily inadvertently activate the same. There is, therefore, the need for an underwater pressure protection switch which does not suffer from these deficiencies.

SUMMARY OF THE INVENTION

The present invention overcomes all of the deficiencies of the prior art described above and provides a switch mechanism for an underwater camera or similar instrument which will allow the same to function properly at very significant depths. According to the invention, a toggle lever is pivotally mounted on the camera body so that one end thereof overlies the shutter release button and the other end is remote therefrom. A frame member also mounted on the camera body surrounds the lever and extends upwardly from the body so as to space the flexible plastic housing from the lever or at least from that portion of the lever which overlies the shutter button. The frame member has an opening at the top thereof so that the operator's finger can press the lever through the flexible plastic housing. When the first end of the lever is pressed, the other end rises and engages the flexible plastic housing. The housing can then act on the second end of the lever to help return the button to its normal position. If necessary, manual force can be applied to the second end of the lever in order to assist movement of the same.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a camera within an underwater flexible plastic housing utilizing an underwater pressure protection switch in accordance with the principles of the present invention;

FIG. 2 is a perspective view of a portion of the camera shown in FIG. 1;

FIG. 3 is an exploded view of the component parts shown in FIG. 2;

FIG. 4 is a cross-sectional view taken through the line 4—4 of FIG. 2;

DETAILED DESCRIPTION OF THE PREFERRED EMBODIMENT

Figure 5:
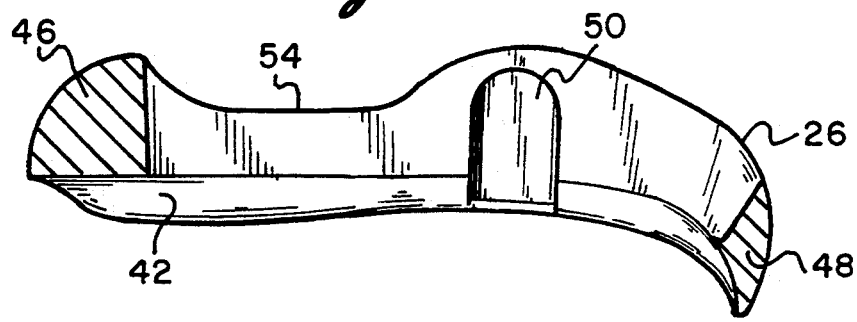
FIG. 5 is a cross-sectional view taken through the line 5—5 of FIG. 3.

Referring now to the drawings in detail wherein like references numerals have been used throughout the various figures to designate like elements, there is shown in FIG. 1 an underwater camera arrangement constructed in accordance with the principles of the present invention and designated generally as 10. The arrangement 10 is comprised essentially of a camera 12 and a flexible plastic housing 14. The camera 12 and housing 14 are, per se, well known in the art and will not, therefore, be described in detail herein. The camera is essentially a standard 35 mm camera such as model SL-100 SeaLife Camera available from Pioneer & Co., Inc. of Westmont N.J. Similarly, the waterproof camera housing 14 is also available under the name SeaLife from Pioneer & Co., Inc. Obviously, however, the present invention is not intended to be limited to these particular models but may be used with substantially any still or video camera or similar instrument having a depressible button or activator and substantially any flexible housing.

The camera 12 includes a conventional lens and shutter arrangement 16 and a shutter release button 18. As is well known in the art, the shutter release button 18 is a depressible button which, when depressed, opens and closes the shutter in order to take a picture. This button also advances the film and discharges the flash 20. As is also well known in the art, the mechanism associated with the shutter release button 18 includes a spring which biases the button 18 in its upward position. Accordingly, after the button 18 is depressed and finger pressure is removed therefrom, it tends to return upwardly to its raised position.

When used underwater and particularly at relatively significant depths, it is known that water pressure on the flexible housing 14 places the same pressure against the button 18, thereby interfering with its ability to return to its upward position. In order to overcome this problem the spring that returns the button to its upward position has been replaced by a new spring having substantially greater force. In addition the present invention includes a pressure protection switch mechanism which is mounted on the body of the camera 12 and designated generally as 20.

The pressure protection switch mechanism 20 is comprised essentially of three parts: a fulcrum 22, a toggle lever 24 and a frame member 26. Fulcrum member 22 is cemented or otherwise secured to the upper wall 20 of the camera 12 close to the vertically extending side wall 30. As shown most clearly in FIGS. 6 and 7, the fulcrum 22 is located under the toggle lever 24 immediately adjacent the outwardly extending tabs 32 and 34. The tabs 32 and 34 essentially divide the lever 24 into two parts: a first end 36 that overlies the shutter release button 18 and a shorter second end which extends away from the button 18 and towards the end wall 30. Mounted on the undersurface of the first end 36 of the lever 24 is a rounded projection 40 which is adapted to engage the shutter release button 18.

Substantially surrounding the lever 24 is the toggle frame member 26. In the preferred embodiment of the invention, the frame member 26 includes a front wall 42, a rear wall 44, a right side wall 46 (when viewed in FIGS. 1-3, 6 and 7) and a left side wall 48. The inner surfaces of the front and rear walls 42 and 44 include vertically extending grooves 50 and 52 formed therein, respectively, in order to accommodate the tabs 32 and 34 of the lever 36. The uppermost portions of the tabs 32 and 34 and the uppermost portions of the grooves 50 and 52 are rounded so as to allow pivotal movement between the lever 24 and the frame 26.

The frame member 26 with the lever 24 inserted therein from the bottom of the frame is adapted to be secured to the outer surface of the body of the camera 12. As shown most clearly in FIGS. 2, 6 and 7, the frame 26 lies essentially on the top wall 28 of the camera body. However, the left wall 48 of the frame 26 extends downwardly and on the upper part of the side wall 30. Furthermore, and as is best seen in FIG. 4, the front wall 42 extends downwardly slightly onto the front face of the camera 12. This not only provides more surface contact between the parts so that they can be more easily secured together but also provides for a more ascetically pleasing appearance. This increased surface area also protects the camera body from breaking by distributing the forces from the water pressure over a larger area. As with the fulcrum 22 the frame member 26 is secured to the camera body through the use of an adhesive, cement or any other known means.

With the frame member 26 in place on the camera body, the ends of the fulcrum 22 lie within the grooves 50 and 52 of the side walls 42 and 44 directly below the tabs 32 and 34 of the lever 24. The lever 24 is, therefore, free to pivot. That is, the first end 36 of the lever 24 can be depressed or moved downwardly so that the projection 40 engages the button 18 and likewise depresses the same. When the first end 36 of the lever 24 is moved downwardly, the second end 38 moves in unison therewith and pivots upwardly. Similarly, if the second end 38 of the lever 24 were to be moved downwardly toward the camera 12, the first end 36 moves upwardly.

Figure 6:
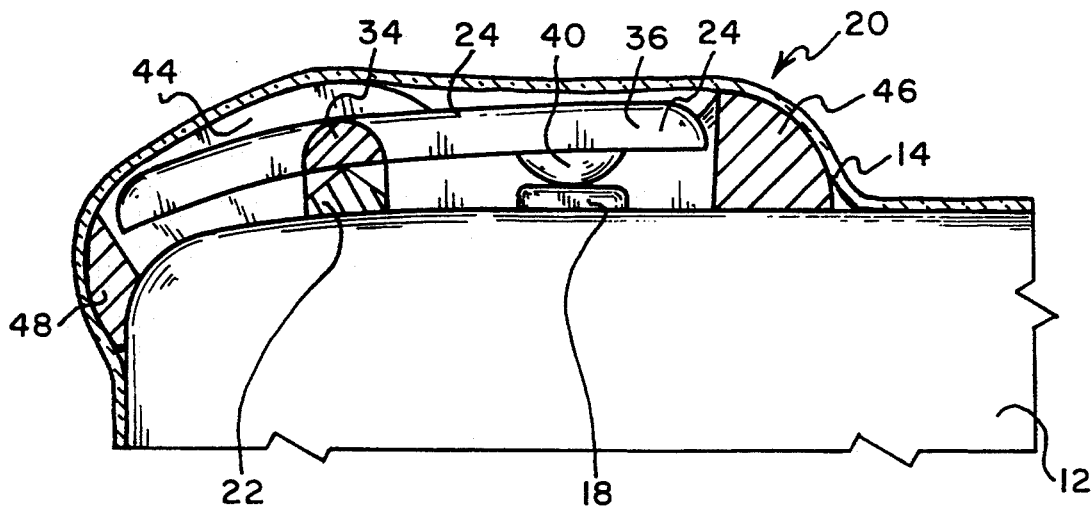
FIG. 6 is a cross-sectional view taken through the line 6—6 of FIG. 1.
Figure 7:
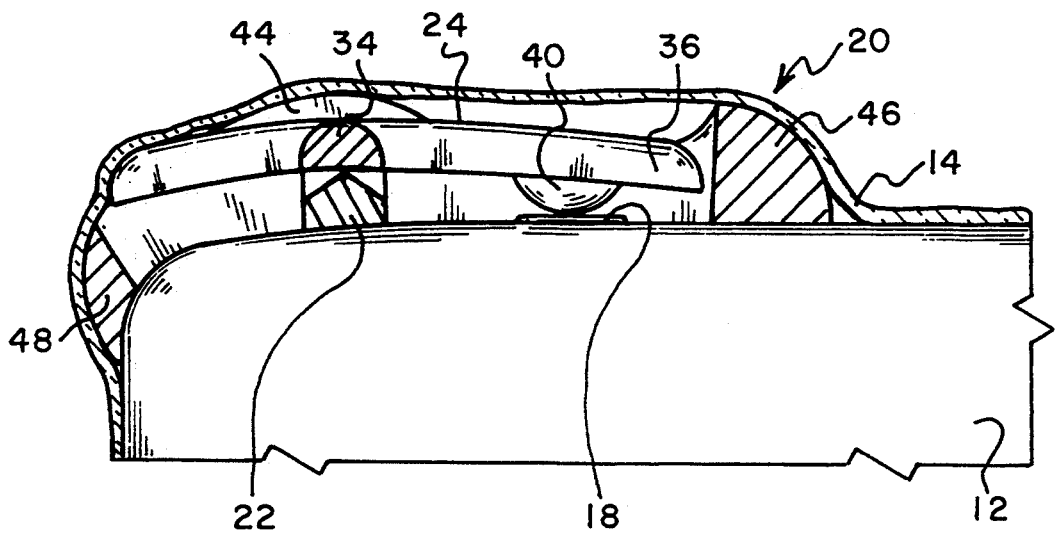
FIG. 7 is a view similar to FIG. 6 but showing the shutter button depressed.

As is perhaps best shown in FIGS. 5-7, at least portions of the walls of the frame member 26 extend upwardly above the top of the first end 36 of the lever 24. In the preferred embodiment of the invention, the right side wall 46 and the portions of the front and rear walls 42 and 44 adjacent the pivot point extend upwardly from the top wall 28 of the camera 12 to support the flexible plastic housing above the top of the first end of the lever 24 whether the lever is in the depressed position as shown in FIG. 7 or its upright position as shown in FIG. 6. These walls, therefore, inhibit or reduce the amount of contact between the flexible housing 14 and the first end of the lever. The front and rear walls 42 and 44, however, include recessed portions 54 and 56 therein to permit assess to the first end 36 of the lever 24 by a person's finger which may be positioned across the frame member 26. This feature is particularly useful to a diver who is wearing gloves to assist him in properly locating the switch. Furthermore, such a diver can more easily depress the lever 24 than the button 18 because of the larger size thereof.

When the second end 36 of the lever 24 is in its normal down position as shown in FIG. 6, the upstanding front and rear walls 42 and 44 and the left side wall 48 of the frame member 26 support the flexible plastic housing 14 above the top of the second end 38. However, when the first end 36 of the lever 24 is depressed as shown in FIG. 7 in order to depress the shutter button 18, the second end 38 rises and engages the flexible plastic housing 14. Water pressure on the housing 14 exerts downward or inward pressure on the second end 38 of lever 24 thereby helping to raise the first end 36 of the lever 24 upwardly to allow the button 18 to also rise.

The pressure compensating switch of the present invention is utilized in the follow manner. With the camera 12 positioned within the flexible plastic housing 14, the same is waterproof and is intended to be used for taking underwater pictures. At significant depths, the water pressure on the outside of the housing tends to force the flexible plastic to more tightly enclose the camera body. When it is desired to take a picture, the photographer can place his finger over the housing 14 above the lever 24. He can do this with his finger either in alignment with the length of the lever 24 across the first end 36 thereof in alignment with the recesses 54 and 56 of the frame member 26. He then depresses the first end 36 of the lever 24 which, in turn, depresses the button 18 as described above. When the operator removes the pressure of his finger from the top of the first end 36 of the lever 24, the same will move upwardly through the upward spring force associated with the button 18 and the downward water pressure force on the second end 38 of the lever 24. In the event, however, that the button 18 does not automatically return, a manual downward force can be applied to the raised upper end 38 to force the first end 38 upwardly and to, allow the button 18 to return to its upward position.

The rounded outer shape of the frame member 26 allows an even stretching of the flexible plastic housing 14 under pressure resulting in sufficient remaining flexibility of the plastic to allow the lever 24 to be moved. This rounded shape also avoids the danger of tearing the plastic housing which could otherwise occur if the same were stretched over sharp edges. Even further, the frame member protects the lever 24 from breakage by reducing the total amount of pressure thereon.

The present invention may be embodied in other specific forms without departing from the spirit or essential attributes thereof and accordingly reference should be made to the appended claims rather than to the foregoing specification as indicating the scope of the invention.

I claim:

1. In an underwater camera including a camera body having a depressible actuator button carried thereon and a water resistant flexible housing enclosing said camera body, the improvement comprising:

a toggle lever pivotally mounted on said camera body; said lever having a first end that overlies said button so that depression of said first end toward said camera body depresses said button; said lever having a second end which moves in unison with said first end, depression of said second end toward said camera body acting to move said first end away from said camera body, and toggle frame means mounted on said camera body adjacent said lever, at least a portion of said frame means extending outwardly from said camera body to reduce the amount of contact between said flexible housing and said first end of said lever.

2. The invention as claimed in claim 1 wherein said frame means also reduces the amount of contact between said flexible housing and said second end of said lever when said first end has not been depressed.

3. The invention as claimed in claim 2 wherein said second end extends beyond said frame means to contact said flexible housing when said first end is depressed.

4. The invention as claimed in claim 1 wherein said frame means substantially surrounds said toggle lever.

5. The invention as claimed in claim 4 wherein said lever is pivotally mounted to said frame means.

6. The invention as claimed in claim 4 wherein said frame means includes a recess in an upper surface thereof adjacent said first end of said lever to aid the user in locating said first end.

7. The invention as claimed in claim 1 wherein said lever includes a projection carried by said first end thereof which is adapted to engage said button when said first end is depressed.

8. The invention as claimed in claim 1 further including a pivot fulcrum carried by said camera body.

9. The invention as claimed in claim 1 wherein said first end of said lever is longer than said second end.

10. The invention as claimed in claim 1 wherein said body includes an upper wall and wherein said button is located on said upper wall.

11. The invention as claimed in claim 10 wherein said body further includes a side wall and wherein said frame means is mounted on said upper wall and extends on to said side wall.

12. In an underwater camera including a camera body having a depressible actuator button carried thereon and a water resistant flexible housing enclosing said camera body, the improvement comprising:

a toggle lever pivotally mounted on said camera body; said lever having a portion that overlies said button so that depression of said portion toward said camera body depresses said button, and toggle frame means mounted on said camera body adjacent said lever, at least a portion of said frame means extending outwardly from said camera body to reduce the amount of contact between said flexible housing and said lever.

13. The invention as claimed in claim 12 wherein said frame means substantially surrounds said toggle lever.

14. The invention as claimed in claim 12 wherein said lever is pivotally mounted to said frame means.

15. The invention as claimed in claim 12 wherein said lever includes a projection extending downwardly which is adapted to engage said button when said lever is depressed.

16. The invention as claimed in claim 12 further including a pivot fulcrum carried by said camera body, 17. The invention as claimed in claim 12 wherein said body includes an upper wall and wherein said button is located on said upper wall.

18. The invention as claimed in claim 17 wherein said body further includes a side wall and wherein said frame means is mounted on said upper wall and extends on to said side wall.

* * * * *